United States Patent
Yu et al.

(10) Patent No.: US 6,431,531 B1
(45) Date of Patent: Aug. 13, 2002

(54) COMPOSITE TORSION BAR

(75) Inventors: Kenneth Kinfun Yu, Clarkston; Stephen Joseph Doyle, Jr., Northville, both of MI (US)

(73) Assignee: Meritor Heavy Vehicle Technology, LLC, Troy, MI (US)

( * ) Notice: Subject to any disclaimer, the term of this patent is extended or adjusted under 35 U.S.C. 154(b) by 0 days.

(21) Appl. No.: 09/963,767

(22) Filed: Sep. 26, 2001

(51) Int. Cl.[7] .................................................. F16F 1/14
(52) U.S. Cl. ......................................... 267/154; 267/273
(58) Field of Search ................................. 267/154, 273, 267/5.511; 280/124.166, 124.106, 684; 72/340

(56) References Cited

U.S. PATENT DOCUMENTS

| | | | |
|---|---|---|---|
| 2,953,674 A | * 9/1960 | Grodt | 219/52 |
| 4,171,626 A | 10/1979 | Yates et al. | |
| 4,231,555 A | * 11/1980 | Saito | 267/154 |
| 4,265,951 A | 5/1981 | Yates et al. | |
| 4,648,620 A | * 3/1987 | Nuss | 280/689 |
| 4,908,930 A | 3/1990 | Wycech | |
| 5,520,376 A | * 5/1996 | Langa et al. | 267/273 |
| 5,549,370 A | 8/1996 | Folsom | |
| 5,603,490 A | 2/1997 | Folsom | |
| 5,979,209 A | * 11/1999 | Belliato et al. | 72/340 |
| 5,997,970 A | 12/1999 | You | |

* cited by examiner

Primary Examiner—Christopher P. Schwartz
(74) Attorney, Agent, or Firm—Carlson, Gaskey & Olds

(57) ABSTRACT

A vehicle suspension assembly is provided that includes a vehicle frame. A suspension member is pivotally supported on a portion of the frame. A torsion bar having a longitudinal axis and first and second opposing ends is supported between the vehicle frame and a suspension member by its ends. The torsion bar is twisted about the longitudinal axis in response to the suspension member pivoting relative to the frame. Resin coated reinforcing fibers are secured to the exterior surface of the torsion bar at an angle relative to the longitudinal axis. The torsion bar may be hollow to reduce the weight of the torsion bar. The resin coated carbon fibers are cured to the exterior surface by an oven or by induction heating.

17 Claims, 1 Drawing Sheet

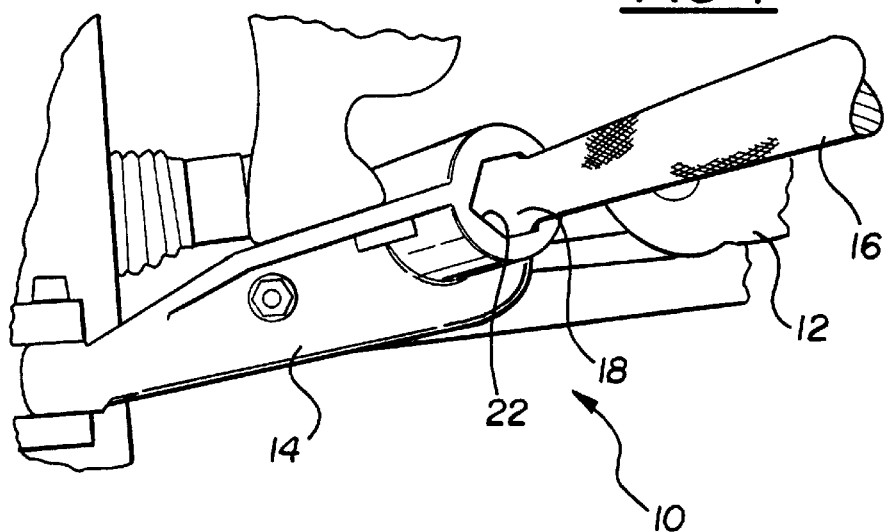
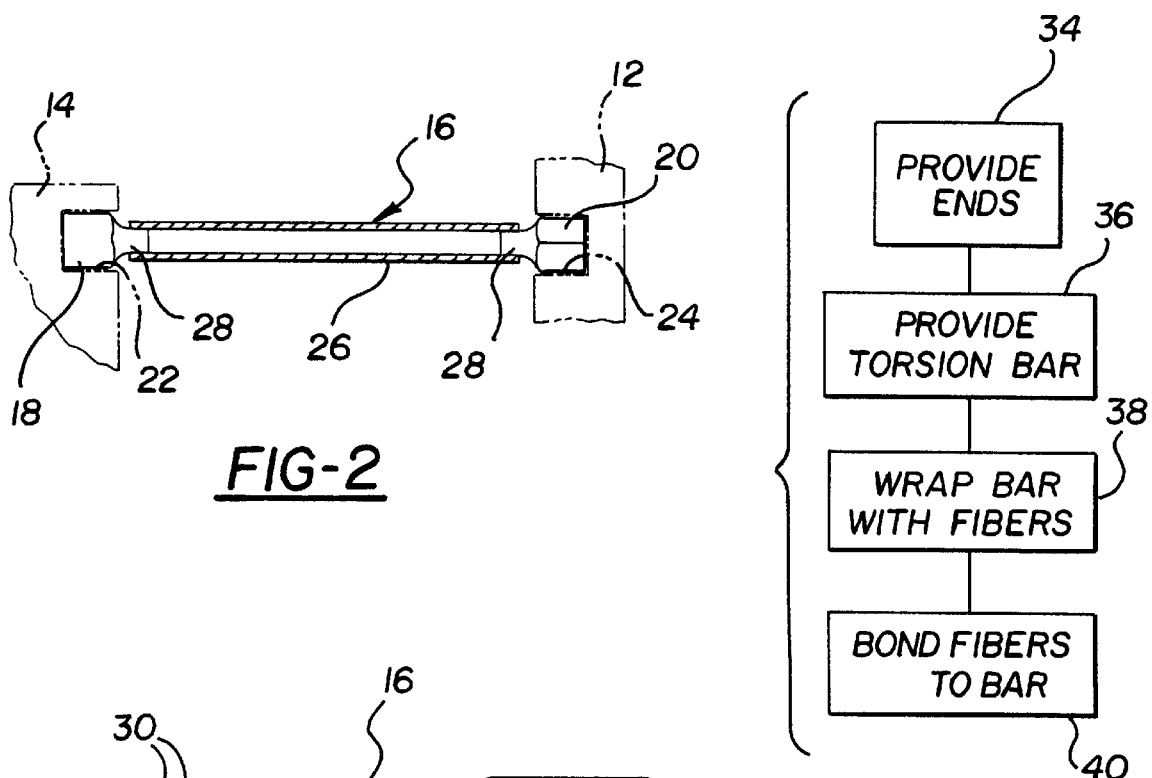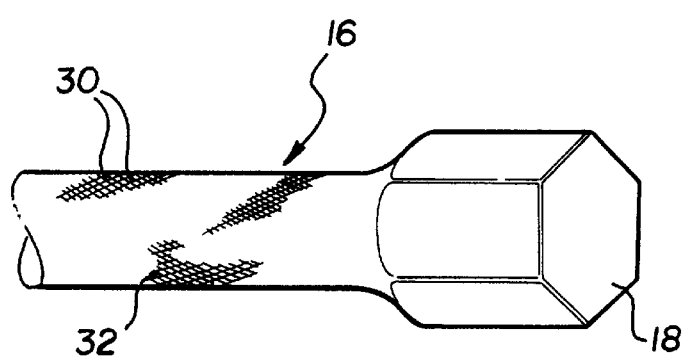

COMPOSITE TORSION BAR

BACKGROUND OF THE INVENTION

This invention relates to a torsion bar for a vehicle suspension assembly. More particularly, the invention relates to a reinforced torsion bar.

Movement of suspension components such as control arms may be dampened by using torsion bars. Typically, the control arm is pivotally supported on a vehicle frame. The torsion bar may be connected between the control arm and the vehicle frame such that during rotation of the control arm relative to the vehicle frame the torsion bar twists to dampen movement of the control arm. Torsion bar arrangements such as those described above are particularly useful where suspension springs are difficult to package.

It is desirable to provide vehicle components with reduced weight to reduce the overall weight of the vehicle. However, a reduction in the size of the torsion bar may yield a torsion bar of insufficient strength. The prior art has proposed the use of hollow torsion bars in which reinforcing material fills the cavity of the hollow bar. This has provided a reinforced torsion bar with reduced weight. However, torsion bars are subjected to corrosion at their exterior surface which may weaken the torsion bar over time. Therefore, what is needed is a reinforced torsion bar that is less susceptible to corrosion.

SUMMARY OF THE INVENTION AND ADVANTAGES

The present invention provides a vehicle suspension assembly including a vehicle frame. A suspension member is pivotally supported on a portion of the frame. A torsion bar having a longitudinal axis and first and second opposing ends is supported between the vehicle frame and a suspension member by its ends. The torsion bar is twisted about the longitudinal axis in response to the suspension member pivoting relative to the frame. Resin coated reinforcing fibers are secured to the exterior surface of the torsion bar at an angle relative to the longitudinal axis. The torsion bar may be hollow to reduce the weight of the torsion bar. The resin coated carbon fibers are cured to the exterior surface by an oven or by induction heating.

Accordingly, the above invention provides a reinforced lighter weight torsion bar that is less susceptible to corrosion.

BRIEF DESCRIPTION OF THE DRAWINGS

Other advantages of the present invention can be understood by reference to the following detailed description when considered in connection with the accompanying drawings wherein:

FIG. 1 is a perspective view of a portion of a vehicle suspension assembly;

FIG. 2 is a cross-sectional view of the torsion bar shown in FIG. 1;

FIG. 3 is a perspective view of the present invention torsion bar with reinforcing fibers; and FIG. 4 is a flowchart depicting a method of manufacturing the present invention torsion bar.

DETAILED DESCRIPTION OF THE PREFERRED EMBODIMENT

A vehicle suspension assembly 10 is shown in FIGS. 1 and 2. The suspension assembly 10 includes a frame 12 that pivotally supports a suspension member 14 for movement in response to inputs from the roadway. The control arm 14 supports a wheel which may be driven by a driveline from a transmission for four-wheel drive applications. For such four-wheel drive applications, it may be difficult to package a suspension spring. To this end, torsion bars 16 have been used to dampen control arm movement. The torsion bar 16 includes first 18 and second 20 opposing ends, which may have a hexagonal cross-sectional. The ends 18 and 20 are received in complementary hexagonal recesses 22 and 24 respectively in the control arm 14 and frame 12.

The torsion bar 16 may be constructed from a metallic material such as aluminum, iron, steel, or any other suitable material. The torsion bar 16 may include a hollow longitudinal member 26 to reduce the weight of the torsion bar. The hexagonal ends 18 and 20 may be provided by securing inserts 28 to the longitudinal member 26. Alternatively, the ends 18, 20 may be forged to provide the hexagonal cross-section. It is to be understood that the ends may have any shape and may be secured to the suspension member 14 and frame 12 in any suitable manner.

Referring to FIG. 3, the present invention utilizes reinforcing fibers 30, which are preferably resin coated carbon fibers, secured to an exterior surface of the torsion bar 16 at an angle relative to longitudinal axis. The angle may be chosen to provide the greatest strength if desired. The fibers 30 may be arranged in opposite directions if desired for maximum strength in each rotational direction. In this manner, the amount of metal used to construct a torsion bar 16 may be reduced and sufficient torsional strength may be provided by the reinforcing fibers 30.

A method of manufacturing the present invention torsion bar is depicted in FIG. 4. The hexagonal ends 18, 20 may be provided, as indicated at block 34, by forging the hexagonal ends or securing inserts to longitudinal member. The exterior surface of the torsion bar is prepared, if necessary, as indicated at block 36, for the reinforcing fibers. The reinforcing fibers 30 are wrapped about the exterior surface 32 of the torsion bar 16, as indicated at block 38. The fibers 30 are bonded to the exterior surface 32 by curing the resin, which may be done using either a oven or induction heating, as indicated at block 40.

The invention has been described in an illustrative manner, and it is to be understood that the terminology that has been used is intended to be in the nature of words of description rather than of limitation. Obviously, many modifications and variations of the present invention are possible in light of the above teachings. It is, therefore, to be understood that within the scope of the appended claims the invention may be practiced otherwise than as specifically described.

What is claimed is:

1. A method of manufacturing a torsion bar comprising the steps of:
    a) providing a metallic longitudinal member having an exterior surface;
    b) wrapping reinforcing fibers about the exterior surface; and
    c) bonding the reinforcing fibers to the exterior surface.

2. The method according to claim 1, wherein step a) includes providing a ferrous longitudinal member.

3. The method according to claim 1, wherein step a) includes providing an aluminum longitudinal member.

4. The method according to claim 1, wherein step a) includes providing a hollow metallic longitudinal member.

5. The method according to claim 1, wherein step b) includes wrapping carbon fibers about the exterior surface.

6. The method according to claim 1, wherein step b) includes wrapping the reinforcing fibers at an angle relative to a longitudinal axis of the longitudinal member to obtain a desired torsional strength.

7. The method according to claim 1, wherein step c) includes adhering the reinforcing fibers to the exterior surface with a resin.

8. The method according to claim 7, wherein step c) includes curing the resin in an oven.

9. The method according to claim 7, wherein step c) includes curing the resin by induction heating.

10. The method according to claim 1, further including the step of forging hexagonal ends on the longitudinal member.

11. The method according to claim 1, further including the step of securing hexagonal ends to opposing ends of the longitudinal member.

12. A vehicle suspension assembly comprising:
a vehicle frame;
a suspension member pivotally supported on a portion of said frame;
a torsion bar having a longitudinal axis and first and second opposing ends with said first end supported on said vehicle frame and said second end supported on said suspension member, said torsion bar twisted about said longitudinal axis in response to said suspension member pivoting relative to said vehicle frame; and
reinforcing carbon fibers secured to an exterior surface of said torsion bar.

13. The torsion bar according to claim 11, wherein said torsion bar is metallic.

14. The torsion bar according to claim 11, wherein said torsion bar is hollow.

15. The torsion bar according to claim 11, wherein said ends have a hexagonal cross-sectional area with said ends received in complementary hexagonal recesses in said vehicle frame and said suspension member.

16. The torsion bar according to claim 11, wherein said reinforcing carbon fibers are resin coated.

17. The torsion bar according to claim 11, wherein said reinforcing fibers are arranged at an angle relative to said longitudinal axis.

* * * * *